United States Patent
Witter et al.

(10) Patent No.: US 9,103,417 B2
(45) Date of Patent: Aug. 11, 2015

(54) CAM FOLLOWER

(71) Applicant: Schaeffler Technologies AG & Co. KG, Herzogenaurach (DE)

(72) Inventors: Oliver Witter, Westhausen (DE); Michael Kress, Lonnerstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 219 days.

(21) Appl. No.: 13/855,158

(22) Filed: Apr. 2, 2013

(65) Prior Publication Data

US 2013/0263695 A1 Oct. 10, 2013

(30) Foreign Application Priority Data

Apr. 5, 2012 (DE) .................. 10 2012 205 695

(51) Int. Cl.
*F16H 25/14* (2006.01)
*F01L 1/18* (2006.01)

(52) U.S. Cl.
CPC ............... *F16H 25/14* (2013.01); *F01L 1/185* (2013.01); *Y10T 74/2107* (2015.01)

(58) Field of Classification Search
CPC .......... F01L 1/185; F16H 25/14; F16F 15/30
USPC .............. 74/569; 123/90.39, 90.41, 90.44
See application file for complete search history.

(56) References Cited

U.S. PATENT DOCUMENTS

| | | | | |
|---|---|---|---|---|
| 5,251,585 A | * | 10/1993 | Graber | 123/90.39 |
| 2004/0045518 A1 | * | 3/2004 | Abe | 123/90.41 |
| 2004/0074459 A1 | * | 4/2004 | Hayman et al. | 123/90.44 |
| 2004/0206324 A1 | * | 10/2004 | Artmann | 123/90.39 |
| 2006/0137637 A1 | * | 6/2006 | Abe et al. | 123/90.39 |
| 2010/0018485 A1 | * | 1/2010 | Moeck et al. | 123/90.39 |

FOREIGN PATENT DOCUMENTS

| | | | | |
|---|---|---|---|---|
| DE | 10 2007 012 734 A1 | * | 9/2008 | F01L 1/18 |
| DE | 10 2008 029 333 A1 | * | 12/2009 | F01L 1/12 |
| DE | 102010013216 | | 10/2010 | |

OTHER PUBLICATIONS

English Abstract of DE 10 2007 012 734 A1, Huschka et al., Sep. 2008.*
EPO Bibliographic data: DE 102008029333, Mark et al., Dec. 2009.*

* cited by examiner

*Primary Examiner* — Vinh Luong
(74) *Attorney, Agent, or Firm* — Volpe and Koenig, P.C.

(57) ABSTRACT

A lever-type cam follower for a valve train of an internal combustion engine, the cam follower having two side walls which are connected to each other through a crossbar on whose underside, on one end, a support for a gas exchange valve is disposed, the crossbar having a recess through which a roller extends, the roller is supported via a bearing on a pin seated in the side walls, wherein the roller is so narrow that outer front ends of the roller are clearly spaced from and out of contact with longitudinal surfaces of the recess, one guide extension projects from each of the longitudinal surfaces towards a central longitudinal plane of the cam follower, and the roller is guided on inner sides of the at least one guide extension.

7 Claims, 1 Drawing Sheet

CAM FOLLOWER

INCORPORATION BY REFERENCE

The following documents are incorporated herein by reference as if fully set forth: German Patent Application No. 102012205695.5, filed Apr. 5, 2012.

BACKGROUND

The invention concerns a lever-type cam follower for a valve train of an internal combustion engine, said cam follower comprising two side walls which are connected to each other through a crossbar on whose underside, on one end, a support for a gas exchange valve is disposed, said crossbar comprising a recess through which a roller extends right through, said roller extending via a bearing on a pin seated in said side walls and serving for an at least indirect cam run-on.

A cam follower of the above-noted type, in this case for a variable sliding cam valve train of an internal combustion engine, is disclosed in FIG. 1 of DE 10 2010 013 216 A1.

For instance, in modern cylinder head designs of compact internal combustion engines with sliding cam valve control, only a very restricted design space is available for the components required. For this reason, among other things, the rollers for the cam run-on must have a comparatively narrow configuration. A narrow roller as such requires a cam follower with a narrow design space requirement so that the roller with its required small axial lash still has a good lateral guidance on the side walls of the cam follower and, at the same time, does not tend to tilt on the pin. Thus, it is clear that one cannot have recourse to available lever designs, for example out of the non-switchable, "classical" valve train technology. New designing of a cam follower with a comparatively narrow configuration comprising a narrow roller necessitates immense costs for the purchase of tools and machines.

SUMMARY

It is therefore an object of the invention to provide a cam follower that is suitable for restricted design space and can be realized without a complex and expensive new construction.

The invention achieves the above object by the fact that the roller is so narrow that outer front ends of the roller are indeed clearly spaced from and without contact with longitudinal surfaces of the recess, but at least one guide extension projects from each of the longitudinal surfaces towards a central longitudinal plane of the cam follower, the roller being guided on inner sides of the at least one guide extension.

In this way, the aforesaid drawbacks are eliminated. It is possible to have recourse substantially to existing cam follower designs without the need of developing complex new constructions. In particular, it is thus possible to use a broader (finished) cam follower which naturally comprises a comparatively broad recess. The roller receives a lateral, substantially tilt-free guidance with slight lash on the proposed guide extensions of the longitudinal surfaces of the recess.

It is thus apparent that it is on the whole possible to have recourse to a completed, manufactured cam follower and only provide guide extensions with variable projection lengths. For instance, if the cam follower is to be manufactured by punching and bending, the cutting tool needs only a slight, low-cost modification.

According to a further improvement of the invention, the longitudinal surfaces of the recess are configured to be aligned to the inner surfaces of the side walls. In this way, a simple, low-cost design is realized. It is, however, likewise imaginable and intended to let each longitudinal surface extend from a respective collar that is oriented towards the center of the recess.

A further aspect of the invention provides advantageous arrangements of the preferably integrally connected guide extensions. These extensions must be connected at least near one transverse surface of the recess but can also be disposed diagonally opposite each other near the two transverse surfaces. However, this alternative is more complex and expensive but it guarantees a particularly good guidance for the cam roller.

According to one aspect of the invention, to enhance the rigidity of the cam follower, the cam follower comprises, in the region of the roller, a bellied portion oriented in a direction leading away from the lever. This configuration additionally guarantees a comparatively gentle guidance of the cam roller between the guide extensions.

Suitable as a bearing for the roller are a rolling bearing such as a needle roller bearing or a sliding ring or both of these. Advantageously, the rolling bearing should project over the outer front ends of the roller to a point directly in front of inner surfaces of the side walls and protrude beyond the pin. In this way, the contact pressure on the pin (small diameter), which, for instance, can be core hardened or surface hardened, is reduced.

As already mentioned above, the cam follower can be made by a punching and bending method out of sheet metal. However, the invention also includes a manufacturing of the cam follower by methods such as MIM, extrusion molding, machining or casting.

The cam follower configured, for instance, as a finger lever or an oscillating lever, is particularly suitable for variable sliding cam valve trains. It can, however, also be used in electrohydraulic or "classical" valve trains of a non-switchable type.

BRIEF DESCRIPTION OF THE DRAWINGS

The foregoing Summary as well as the following Detailed Description will be best understood when reviewed in conjunction with the appended drawings, in which.

DETAILED DESCRIPTION OF THE PREFERRED EMBODIMENTS

Figure 1:
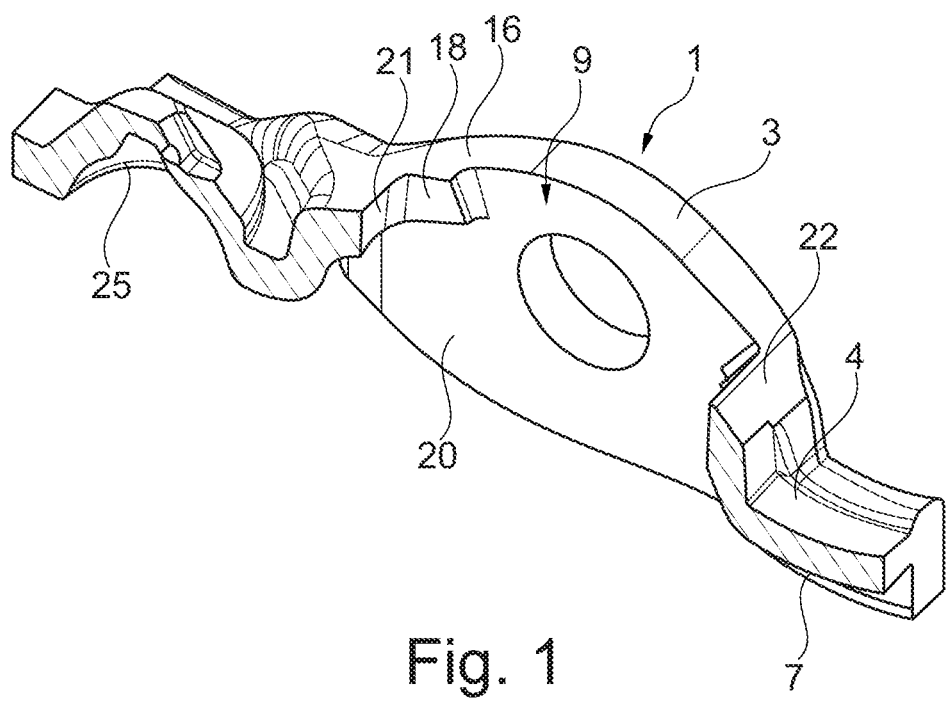
FIG. 1 shows the cam follower in a perspective view, in a longitudinal section.

What is shown is a cam follower 1 made as a sheet metal finger lever for a valve train of an internal combustion engine. The cam follower 1 comprises two substantially vertical side walls 2, 3 that are connected to each other by a crossbar 4 on the top, so that an inverse U-profile is formed in cross-section.

A support 7 for a gas exchange valve is arranged on one end 6 on an underside 5 of the crossbar 4. On a further end 24 of the crossbar 4 is configured on the underside 5, a semi-circular contact surface 25 for a support element.

Figure 2:
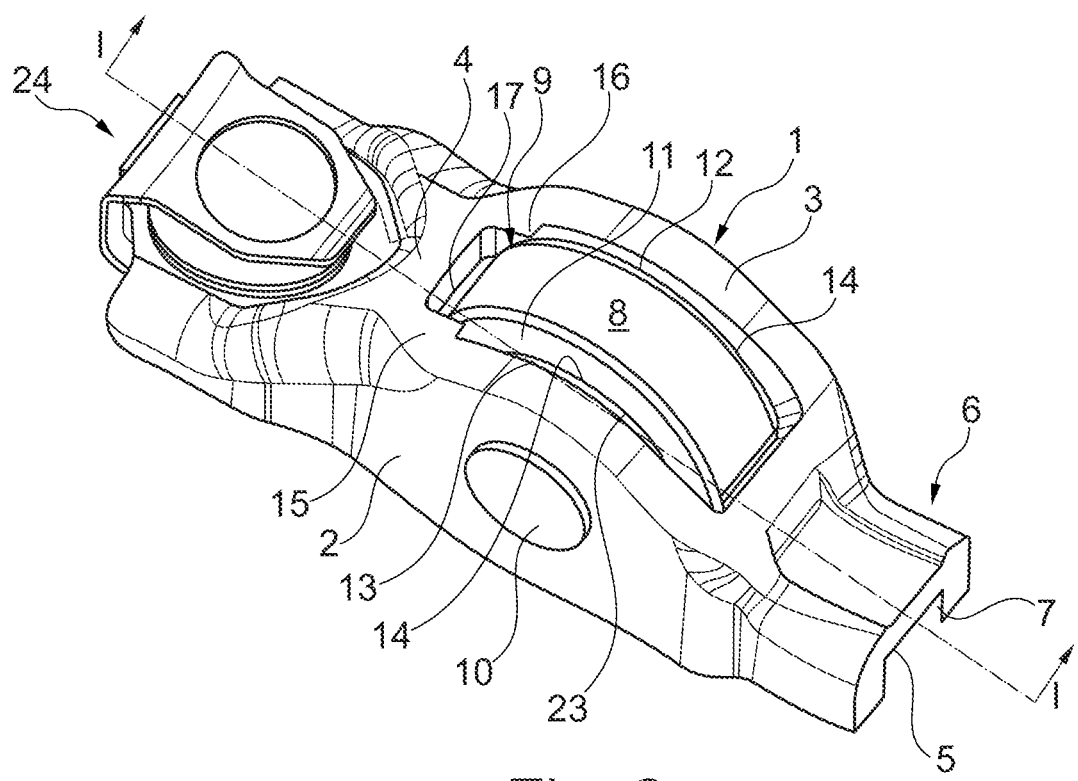
FIG. 2 shows the cam follower of FIG. 1 in a perspective overall view.

The crossbar 4 comprises a rectangular, frame-like recess 9 through which a roller 8 extends right through. The roller 8 serves as a run-on surface for a cam and extends via a bearing 23 on a pin 10 that is seated in the side walls 2, 3. As can be seen in FIG. 2, the bearing 23 is a needle roller bearing that extends with slight axial lash directly in front of inner surfaces 19, 20 of the side walls 2, 3. It can be further seen that the side walls 2, 3 are bellied upwards near the recess 9.

As disclosed in FIG. 2, the roller 8 is visibly narrower than the recess 9 and thus extends with its outer front ends 11, 12 at a distinct distance from and without any contact with the longitudinal surfaces 13, 14 of the recess 9.

For providing a slight axial lash in the guidance of the roller 8, an integrally connected guide extension 15, 16 projects from each of the longitudinal surfaces 13, 14 in the vicinity of a transverse surface 21 of the recess 9 towards a central longitudinal plane of the cam follower 1. Finally, the roller 8 is guided, substantially free of a tendency to tilt, on inner sides 17, 18 of the guide extensions 15, 16.

It can be seen further in FIG. 1 that, in the final analysis, the longitudinal surfaces 13, 14 of the recess 9 form a simple unit directly with inner surfaces 19, 20 of the side walls 2, 3.

The cam follower 1 is particularly suitable for use in a variable sliding cam valve train.

LIST OF REFERENCE NUMERALS

1 Cam follower
2 Side wall
3 Side wall
4 Crossbar
5 Underside
6 One end
7 Support
8 Roller
9 Recess
10 Pin
11 Outer front end
12 Outer front end
13 Longitudinal surface of recess
14 Longitudinal surface of recess
15 Guide extension
16 Guide extension
17 Inner side
18 Inner side
19 Inner surface
20 Inner surface
21 Transverse surface of recess
22 Transverse surface of recess
23 Bearing
24 Further end
25 Contact surface

The invention claimed is:

1. A lever cam follower for a valve train of an internal combustion engine, said cam follower comprising two side walls which are connected to each other through a crossbar having an underside, having a support for a gas exchange valve disposed on one end, said crossbar comprising a recess through which a roller extends, said roller is supported via a bearing on a pin seated in said side walls and serves for an at least indirect cam run-on, the roller has a width such that axial sides of the roller are spaced apart from and do not contact with longitudinal surfaces of the recess, and at least one guide extension projects from each of the longitudinal surfaces towards one other, the roller being guided via inner sides of the at least one guide extension that projects from each of the longitudinal surfaces acting against the axial sides of the roller.

2. The cam follower according to claim 1, wherein the longitudinal surfaces of the recess are aligned, outside of the guide extensions to inner surfaces of the side walls.

3. The cam follower according to claim 1, wherein, either (a) only one pair of the guide extensions is connected on one of transverse surfaces of the recess, or (b) two pairs of the guide extensions are provided, one pair of said guide extensions extends adjacent one of said transverse surfaces and a further pair of the guide extensions extends adjacent a further one of said transverse surfaces, or (c) one of the guide extensions is connected adjacent one of said transverse surfaces and a further one of the guide extensions is connected adjacent a further one of said transverse surfaces, said extensions being situated diagonally opposite each other.

4. The cam follower according to claim 1, wherein, in a region of the recess, the side walls of the cam follower have a bellied configuration.

5. The cam follower according to claim 1, wherein the cam follower is configured as a finger lever or as an oscillating lever comprising in a cross-section, at least partially, a U-shaped profile or an inverse U-shape profile.

6. The cam follower according to claim 1, wherein a bearing for the roller is a rolling bearing or a sliding ring, or a combination of a rolling bearing and a sliding ring, said bearing protrudes beyond the axial ends of the roller and extends directly in front of inner surfaces of the side walls.

7. The cam follower according to claim 1, wherein the cam follower is adapted to be used in a variable sliding cam valve train.

* * * * *